United States Patent
Ernst et al.

(10) Patent No.: US 10,618,662 B2
(45) Date of Patent: Apr. 14, 2020

(54) RAM FLOW CONTROL WITH PREDICTED RAM AIR FLOW

(71) Applicant: Hamilton Sundstrand Corporation, Charlotte, NC (US)

(72) Inventors: Jeffrey Ernst, Wethersfield, CT (US); Brendon W. Lewis, Simsbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 212 days.

(21) Appl. No.: 15/925,035

(22) Filed: Mar. 19, 2018

(65) Prior Publication Data

US 2019/0283886 A1   Sep. 19, 2019

(51) Int. Cl.
| | | |
|---|---|---|
| *B64D 13/08* | (2006.01) | |
| *B64D 13/06* | (2006.01) | |
| *G05D 23/19* | (2006.01) | |
| *B64D 13/02* | (2006.01) | |

(52) U.S. Cl.
CPC .............. *B64D 13/08* (2013.01); *B64D 13/06* (2013.01); *G05D 23/1931* (2013.01); *B64D 13/02* (2013.01); *B64D 2013/0618* (2013.01)

(58) Field of Classification Search
CPC ........ B64D 13/06; B64D 13/08; B64D 13/02; B64D 2013/0618; G05D 23/1931
USPC ........................................................ 415/17
See application file for complete search history.

(56) References Cited

U.S. PATENT DOCUMENTS

| | | | |
|---|---|---|---|
| 4,675,804 A | 6/1987 | Wiemer | |
| 8,262,018 B2* | 9/2012 | Scherer | B64D 13/00 137/15.2 |
| 8,612,063 B2 | 12/2013 | Lau et al. | |
| 9,789,967 B2 | 10/2017 | Shea et al. | |
| 2008/0073057 A1* | 3/2008 | Kojima | B60H 1/00735 165/43 |
| 2008/0314060 A1 | 12/2008 | Parikh | |
| 2011/0067422 A1* | 3/2011 | Ichishi | B60H 3/0085 62/176.1 |
| 2012/0279698 A1 | 11/2012 | Lau et al. | |
| 2015/0004011 A1* | 1/2015 | Army | F04F 5/18 417/226 |
| 2016/0214722 A1 | 7/2016 | McAuliffe et al. | |
| 2016/0320291 A1* | 11/2016 | Najjar | G01N 17/008 |
| 2016/0356677 A1* | 12/2016 | Bollas | G01M 99/005 |
| 2017/0052072 A1 | 2/2017 | Beaven et al. | |
| 2017/0174348 A1* | 6/2017 | Shea | B64D 13/02 |
| 2017/0242956 A1* | 8/2017 | Zywiak | G06F 17/5095 |

(Continued)

OTHER PUBLICATIONS

Extended European Search Report for EP Application No. 19159179.1, dated Jul. 22, 2019, pp. 5.

*Primary Examiner* — J. Todd Newton
(74) *Attorney, Agent, or Firm* — Kinney & Lange, P.A.

(57) ABSTRACT

A system and method includes a heat exchanger, a ram inlet actuator, and a controller. The ram inlet actuator is configured to control ram air flow from a ram air inlet to the heat exchanger, and the heat exchanger is configured to provide cooling for a bleed air flow. The controller is configured to determine a predicted ram flow based on a bleed air temperature drop across the heat exchanger, a flow rate of the bleed air flow, and a ram air temperature at the ram air inlet. The controller is configured to control the ram inlet actuator based on the predicted ram flow.

20 Claims, 2 Drawing Sheets

(56) References Cited

U.S. PATENT DOCUMENTS

2018/0051945 A1\* 2/2018 Hanov .................... F28F 27/00
2019/0283886 A1\* 9/2019 Ernst .................. G05D 23/1931

\* cited by examiner

RAM FLOW CONTROL WITH PREDICTED RAM AIR FLOW

BACKGROUND

The present invention relates generally to aircraft environmental control systems (ECS), and in particular to a system and method for controlling ram air flow within an aircraft ECS.

An aircraft ECS often includes one or more heat exchangers configured to provide air-to-air cooling for bleed air. The bleed air may be provided to the heat exchangers from an aircraft engine, for example, and be cooled, by the heat exchangers, using ram air flow. A controller for the system is configured to control a ram actuator to control a ram inlet door position, for example, to control the ram air flow to the heat exchangers based on a desired downstream temperature of the bleed air. However, both controlling the ram air flow by controlling the ram inlet door position and controlling the inlet door position by controlling a ram actuator command are non-linear, resulting in imprecise temperature control within the system. It is desirable to increase the precision of the final bleed air temperature control without greatly increasing the complexity and cost of the system.

SUMMARY

A system includes a heat exchanger, a ram inlet actuator, and a controller. The ram inlet actuator is configured to control ram air flow from a ram air inlet to the heat exchanger, and the heat exchanger is configured to provide cooling for a bleed air flow. The controller is configured to determine a predicted ram flow based on a bleed air temperature drop across the heat exchanger, a flow rate of the bleed air flow, and a ram air temperature at the ram air inlet. The controller is configured to control the ram inlet actuator based on the predicted ram flow.

A method of controlling a ram inlet actuator to control ram air provided for cooling a bleed air flow, includes determining, by a controller, a ram air temperature at a ram air inlet, wherein the ram inlet actuator is positioned at the ram air inlet to control ram air flow of the ram air to a heat exchanger; measuring, by the controller, a temperature drop of the bleed air flow across the heat exchanger, wherein the heat exchanger is positioned to provide cooling for the bleed air flow; determining, by the controller, a predicted ram flow using the ram air temperature and the temperature drop; and controlling the ram inlet actuator based on the predicted ram flow.

An aircraft environmental control system includes a primary heat exchanger, a secondary heat exchanger, a ram inlet actuator, and a controller. The primary heat exchanger is positioned to provide cooling for a bleed air flow using a received ram air flow, wherein the ram air flow is received from a ram air inlet. The secondary heat exchanger is positioned to provide cooling for the bleed air flow using the received ram air flow. The ram inlet actuator is positioned at the ram air inlet and configured to control the ram air flow. The controller is configured to determine a first temperature drop of the bleed air flow across the primary heat exchanger, a second temperature drop of the bleed air flow across the secondary heat exchanger, a flow rate of the bleed air flow upstream of the primary heat exchanger, and a ram air temperature at the ram air inlet. The controller determines a predicted ram air flow based on the first and second temperature drops, the flow rate, and the ram air temperature, and controls the ram inlet actuator based on the predicted ram air flow.

DETAILED DESCRIPTION

A ram air flow control system is disclosed herein that utilizes a prediction of ram air flow to perform closed loop control of a ram inlet actuator. An aircraft environmental control system (ECS) includes at least one air-to-air heat exchanger positioned to cool a bleed air flow using ram air. The ram air is drawn in through a ram air inlet and the flow is controlled by the ram inlet actuator. The ram inlet actuator is configured to control a position of an inlet door, for example. The ram inlet actuator is controlled based on a commanded flow, which is set based upon a desired bleed air temperature downstream in the ECS.

The controller then predicts the actual ram flow to provide closed loop control for the ram inlet actuator. The predicted ram flow is based on the bleed air temperature drop across the heat exchanger, the temperature at the ram air inlet, and a measured flow of the bleed air upstream of the heat exchanger. By predicting the ram flow and providing closed loop control of the ram inlet actuator using the predicted ram flow, the error in temperature of the bleed air in the downstream ECS components can be greatly reduced, without greatly increasing the cost and complexity of the system.

Figure 1:
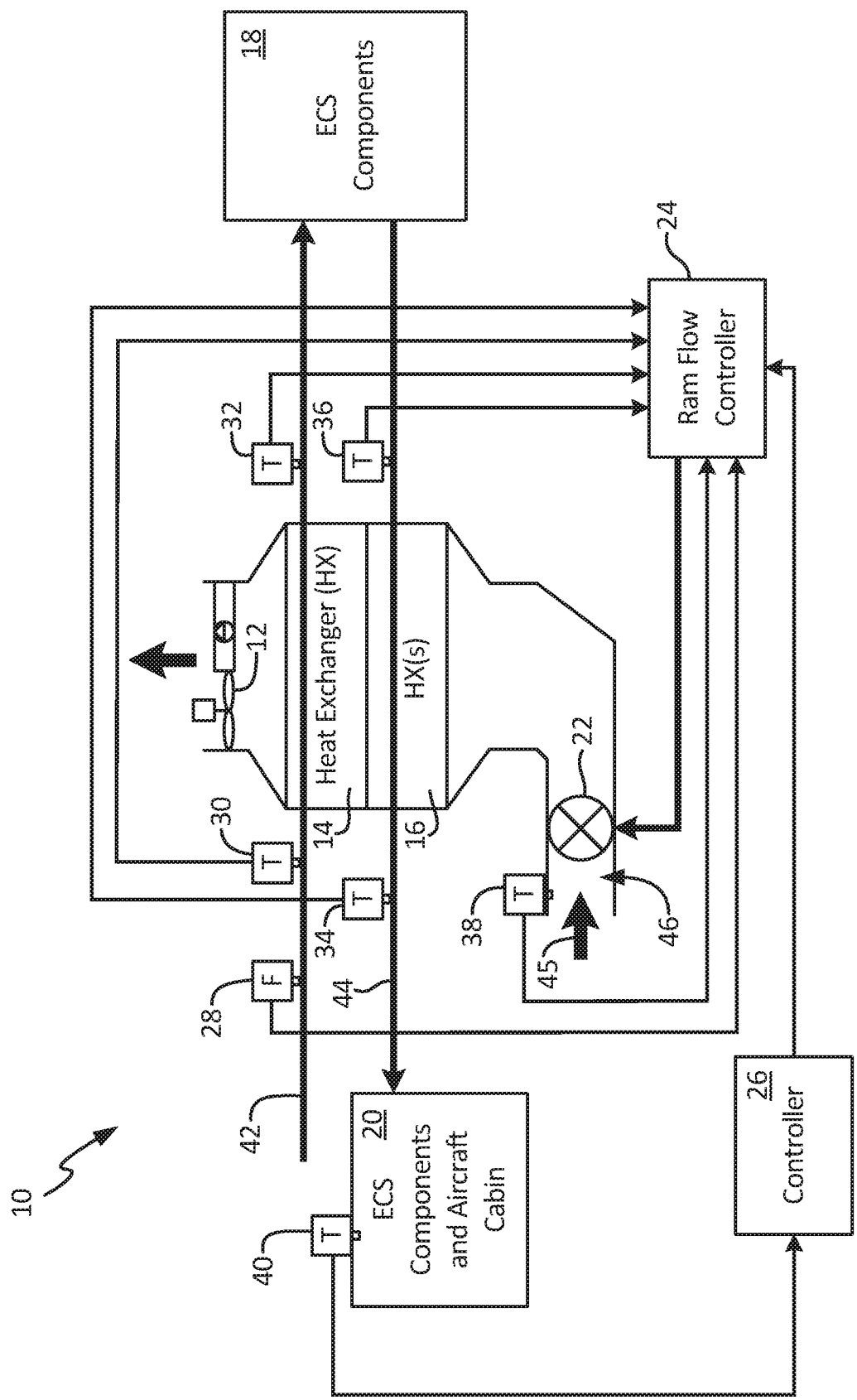
FIG. 1 is a system diagram illustrating an aircraft environmental control system that includes ram flow prediction control.

FIG. 1 is a system diagram illustrating an aircraft environmental control system (ECS) 10 that includes ram flow prediction control. System 10 includes ram fan 12, heat exchangers 14 and 16, midstream ECS components 18, downstream ECS components 20, ram inlet actuator 22, ram flow controller 24, controller 26, flow sensor 28, and temperature sensors 30, 32, 34, 36, 38, and 40. In one embodiment, system 10 may be an aircraft air conditioning pack, and midstream ECS components 18 may include air cycle machine components such as a compressor of the air cycle machine. Downstream ECS components 20 may include other air cycle machine components such as one or more turbines of an air cycle machine configured to drive ram fan 12. Downstream ECS components 20 may also include reheaters, condensers, water collectors, and other ECS components. The bleed air from downstream ECS components 20 may be provided to an aircraft cabin, for example, or may be used to cool electronic components of the aircraft.

Heat exchangers 14 and 16 may be air-to-air heat exchangers configured to provide cooling for bleed air flows 42 and 44. Bleed air flow 42 may be provided to ECS 10 from a bleed air source, such as a main engine compressor. Bleed air flow 42 is provided to heat exchanger 14, which may be a primary heat exchanger, configured to cool bleed air flow 42 using ram air. Bleed air flow 42 flows through, and is worked on by, midstream ECS components 18, which provides bleed air flow 44 to heat exchanger(s) 16. Heat exchanger(s) 16 may be one or more secondary heat exchangers configured to provide air-to-air cooling for bleed air flow 44 using ram air. Bleed air flow 44 flows through, and is worked on by, downstream ECS components 20, and is eventually used to cool the aircraft cabin, to cool aircraft electronics, or for any other cooling purpose.

Ram air 45 is received at ram air inlet 46 and is controlled by ram inlet actuator 22. Ram inlet actuator 22 may connected to control a ram inlet door positioned near the skin of the aircraft, for example. Ram air 45 flows through the ram inlet door to heat exchangers 14 and 16, and exits through ram fan 12. Ram fan 12 may be operated to draw air in through ram air inlet 46, especially when the aircraft is on the ground. Ram air is the primary source of cooling for bleed air flows 42 and 44, and thus, controlling the ram air flow provides the primary temperature control of bleed air flows 42 and 44.

Controller 26, which may be a pack controller for ECS system 10, for example, may monitor an output of temperature sensor 40 to determine if ECS system 10 is providing proper cooling. Controller 26 generates a ram flow command based on the measured temperature and provides the ram flow command to ram flow controller 24. Ram flow controller 24 may also be part of the pack controller or may be a standalone controller. In prior art systems, ram inlet actuator 22 was controlled based solely on a ram position command. Due to the non-linear relationship between the position of the ram inlet door and the ram flow, controlling based solely on the ram position command led to undesirable uncertainty in the temperature control of ECS 10.

To reduce the uncertainty in temperature of the bleed flow at downstream ECS components 20, ram flow controller 24 is configured to predict a ram flow through the ram inlet door and heat exchangers 14 and 16. Ram flow controller 24 receives sensed temperatures from temperature sensors 30, 32, 34, 36, and 38, and receives a sensed flow from flow sensor 28. While illustrated as physical sensors, some of the received sensed temperatures may instead be estimated by ram flow controller 24. For example, the ram inlet temperature may be estimated using ambient temperatures and other environmental values that may be received from other aircraft systems.

The temperatures obtained by ram flow controller 24 allow ram flow controller 24 to determine a temperature drop across heat exchangers 14 and 16, and a temperature of ram air 45 at ram air inlet 46. Knowing the temperature drop across heat exchangers 14 and 16, the initial temperature of the ram flow, and the flow of the bleed air, ram flow controller 24 is able to predict the ram air 45 flow because ram air controller 24 knows the relationship between the ram air 45 flow and the cooling provided to bleed air flows 42 and 44.

Ram flow controller 24 compares the ram flow command to the predicted ram flow and controls ram inlet actuator 22 accordingly. Ram flow controller 24 continues to control ram inlet actuator 22 to adjust a position of the inlet door, for example, until the predicted ram flow matches the ram flow command. Controller 26 continues to monitor the temperature at downstream ECS components 20 and may adjust the ram flow command based on the measured temperature. By providing closed looped control on the ram flow, the precision of the temperature control is improved without greatly increasing the cost and complexity of the system. Additionally, limit cycling, which was an issue in prior art, can be eliminated.

Figure 2:
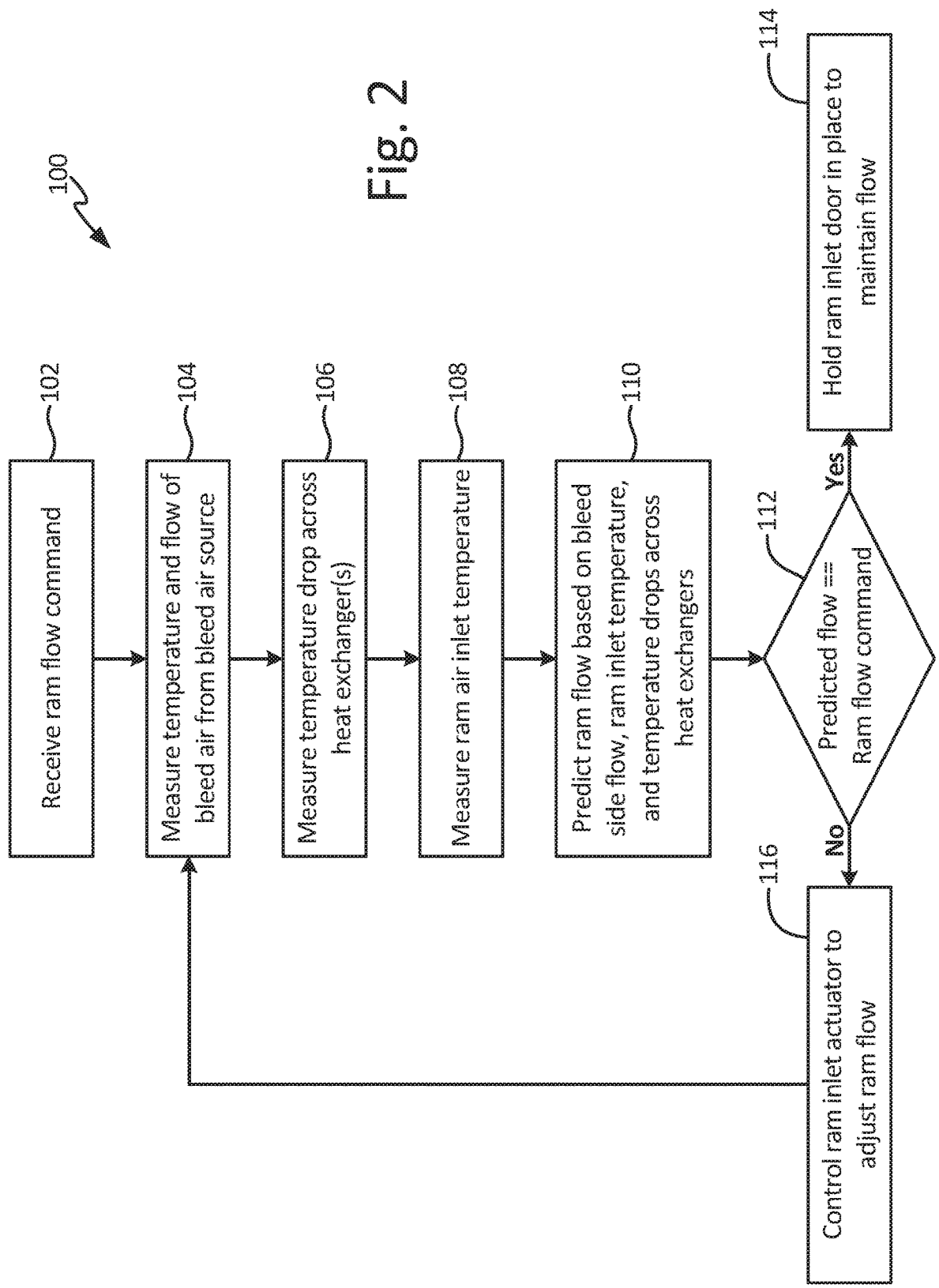
FIG. 2 is a flowchart illustrating a method for controlling a ram inlet actuator using ram flow prediction.

FIG. 2 is a flowchart illustrating method 100 for controlling ram inlet actuator 22 using ram flow prediction. At step 102, ram flow controller 24 receives a ram flow command from controller 26. The ram flow command is an indication of the ram air flow that controller 26 wishes to achieve based upon a desired temperature at downstream ECS components 20. Ram flow controller 24 initially controls ram inlet actuator 22 to achieve an inlet door position for which it is expected to achieve the desired ram air flow. However, variations in the system, such as clogging of heat exchangers 14 and 16, and component flow performance, can lead to unpredictable results. Thus, ram flow controller 24 predicts the actual ram air flow in order to eliminate these uncertainties.

The ram air flow is predicted at steps 104-110. At step 104, a temperature and flow of the bleed air flow is measured upstream of the primary heat exchanger. For example, a sensed temperature from temperature sensor 30 may be provided to ram flow controller 24, and a sensed flow from flow sensor 28 may be provided to ram flow controller 24. At step 106, a temperature drop is measured across each heat exchanger in the system. While illustrated in FIG. 1 as two heat exchangers 14 and 16, system 10 may include any number of heat exchangers for cooling the bleed air flow. The temperature drop across each heat exchanger may be determined by measuring the temperature both upstream and downstream of each heat exchanger. For example, temperature sensors 30, 32, 34, and 36 may provide sensed temperatures to ram flow controller 24 both upstream and downstream of heat exchangers 14 and 16.

The ram air temperature is determined at step 108. This may be a sensed temperature from temperature sensor 38, for example, or may be an estimated temperature. At step 110, the ram air flow is predicted using the ram air inlet temperature, the temperature drops across the heat exchangers, and the bleed side flow. At step 112, the predicted flow is compared to the ram flow command. If the predicted flow matches the ram flow command, method 100 proceeds to step 114 and controls ram inlet actuator 22 to hold the inlet door at its present position to maintain the ram flow. If the predicted flow does not match the ram flow command, method 100 proceeds to step 116 and controls ram inlet actuator 22 to adjust the ram flow. Method 100 then returns to step 104 to once again predict the ram air flow and complete the closed loop control.

By controlling the ram flow in this way, the precision of temperature control is improved without greatly increasing the cost and complexity of the system. Limit cycling can be eliminated, and variances in the system, such as clogged heat exchangers and component flow performance, can be handled.

Discussion of Possible Embodiments

A system includes a heat exchanger, a ram inlet actuator, and a controller. The ram inlet actuator is configured to control ram air flow from a ram air inlet to the heat exchanger, and the heat exchanger is configured to provide cooling for a bleed air flow. The controller is configured to determine a predicted ram flow based on a bleed air temperature drop across the heat exchanger, a flow rate of the bleed air flow, and a ram air temperature at the ram air inlet. The controller is configured to control the ram inlet actuator based on the predicted ram flow.

The system of the preceding paragraph can optionally include, additionally and/or alternatively, any one or more of the following features, configurations and/or additional components:

A further embodiment of the foregoing system, further includes a first temperature sensor positioned to sense a first bleed air temperature of the bleed air flow upstream of the first heat exchanger; and a second temperature sensor positioned to sense a second bleed air temperature of the bleed air flow downstream of the first heat exchanger, wherein the first and second bleed air temperatures are used to determine the first bleed air temperature drop.

A further embodiment of any of the foregoing systems, further includes a second heat exchanger configured to provide cooling for the bleed air flow, wherein controller is further configured to determine the predicted ram flow based on a second bleed air temperature drop across the second heat exchanger.

A further embodiment of any of the foregoing systems, further includes a third temperature sensor positioned to sense a third bleed air temperature of the bleed air flow upstream of the second heat exchanger; and a fourth temperature sensor positioned to sense a fourth bleed air temperature of the bleed air flow downstream of the second heat exchanger, wherein the third and fourth bleed air temperatures are used to determine the second bleed air temperature drop.

A further embodiment of any of the foregoing systems, further includes a fifth temperature sensor positioned to sense the ram air temperature of the ram air flow at the ram air inlet.

A further embodiment of any of the foregoing systems, wherein the ram air temperature is estimated by the controller.

A further embodiment of any of the foregoing systems, further includes a flow sensor positioned upstream of the first heat exchanger and configured to sense the flow rate of the bleed air flow and provide the sensed flow rate to the controller.

A further embodiment of any of the foregoing systems, wherein the controller receives a ram flow command indicative of a desired ram flow, and wherein the controller is further configured to control the ram inlet actuator based on a comparison of the ram flow command and the predicted ram flow.

A further embodiment of any of the foregoing systems, wherein the system is an aircraft environmental control system.

A method of controlling a ram inlet actuator to control ram air provided for cooling a bleed air flow, includes determining, by a controller, a ram air temperature at a ram air inlet, wherein the ram inlet actuator is positioned at the ram air inlet to control ram air flow of the ram air to a heat exchanger; determining, by the controller, a temperature drop of the bleed air flow across the heat exchanger, wherein the heat exchanger is positioned to provide cooling for the bleed air flow; determining, by the controller, a predicted ram flow using the ram air temperature and the temperature drop; and controlling the ram inlet actuator based on the predicted ram flow.

The method of the preceding paragraph can optionally include, additionally and/or alternatively, any one or more of the following features, configurations and/or additional components:

A further embodiment of the foregoing method, wherein measuring, by the controller, a first temperature drop of the bleed air flow across the first heat exchanger includes sensing, by a first temperature sensor, a first bleed air temperature of the bleed air flow upstream of the first heat exchanger; sensing, by a second temperature sensor, a second bleed air temperature of the bleed air flow downstream of the first heat exchanger; and determining the first temperature drop using the first and second bleed air temperatures.

A further embodiment of any of the foregoing methods, further includes measuring, by the controller, a second temperature drop of the bleed air flow across a second heat exchanger, wherein the second heat exchanger is also positioned to provide cooling for the bleed air flow, wherein the predicted ram flow is determined by the controlled based further upon the second temperature drop.

A further embodiment of any of the foregoing methods, wherein measuring, by the controller, the second temperature drop of the bleed air flow across the second heat exchanger includes sensing, by a third temperature sensor, a third bleed air temperature of the bleed air flow upstream of the second heat exchanger; sensing, by a fourth temperature sensor, a fourth bleed air temperature of the bleed air flow downstream of the second heat exchanger; and determining the second temperature drop using the third and fourth bleed air temperatures.

A further embodiment of any of the foregoing methods, wherein determining, by the controller, the ram air temperature at the ram air inlet includes sensing, by a fifth temperature sensor, the ram air temperature of the ram air flow at the ram air inlet.

A further embodiment of any of the foregoing methods, wherein determining, by the controller, the ram air temperature at the ram air inlet includes predicting, by the controller, the ram air temperature of the ram air flow at the ram air inlet.

A further embodiment of any of the foregoing methods, further includes sensing, by a flow sensor positioned, a flow rate of the bleed air flow upstream of the first heat exchanger, wherein the controller is further configured to determine the predicted ram air flow based on the sensed flow rate.

A further embodiment of any of the foregoing methods, further includes receiving, by the controller, a ram flow command indicative of a desired ram flow; and comparing, by the controller, the ram flow command and the predicted ram flow to determine a flow difference.

A further embodiment of any of the foregoing methods, wherein controlling the ram inlet actuator based on the predicted ram flow comprises controlling the ram inlet actuator based on the flow difference.

An aircraft environmental control system includes a primary heat exchanger, a secondary heat exchanger, a ram inlet actuator, and a controller. The primary heat exchanger is positioned to provide cooling for a bleed air flow using a received ram air flow, wherein the ram air flow is received from a ram air inlet. The secondary heat exchanger is positioned to provide cooling for the bleed air flow using the received ram air flow. The ram inlet actuator is positioned at the ram air inlet and configured to control the ram air flow. The controller is configured to determine a first temperature drop of the bleed air flow across the primary heat exchanger, a second temperature drop of the bleed air flow across the secondary heat exchanger, a flow rate of the bleed air flow upstream of the primary heat exchanger, and a ram air temperature at the ram air inlet. The controller determines a predicted ram air flow based on the first and second temperature drops, the flow rate, and the ram air temperature, and controls the ram inlet actuator based on the predicted ram air flow.

The system of the preceding paragraph can optionally include, additionally and/or alternatively, any one or more of the following features, configurations and/or additional components:

A further embodiment of the foregoing system, further includes a first temperature sensor positioned to sense a first bleed air temperature of the bleed air flow upstream of the primary heat exchanger; a second temperature sensor positioned to sense a second bleed air temperature of the bleed air flow downstream of the primary heat exchanger, wherein the first and second bleed air temperatures are used to determine the first temperature drop; a third temperature sensor positioned to sense a third bleed air temperature of the bleed air flow upstream of the secondary heat exchanger; a fourth temperature sensor positioned to sense a fourth bleed air temperature of the bleed air flow downstream of the secondary heat exchanger, wherein the third and fourth bleed air temperatures are used to determine the second temperature drop; a fifth temperature sensor positioned to sense the ram air temperature of the ram air flow at the ram air inlet; and a flow sensor positioned upstream of the primary heat exchanger and configured to sense the flow rate of the bleed air flow upstream of the primary heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a first heat exchanger;
   a ram inlet actuator configured to control ram air flow from a ram air inlet to the first heat exchanger, wherein the first heat exchanger is configured to provide cooling for a bleed air flow; and
   a controller configured to determine a predicted ram flow based on a first bleed air temperature drop across the first heat exchanger, a flow rate of the bleed air flow, and a ram air temperature at the ram air inlet, and wherein the controller is configured to control the ram inlet actuator based on the predicted ram flow.

2. The system of claim 1, further comprising:
   a first temperature sensor positioned to sense a first bleed air temperature of the bleed air flow upstream of the first heat exchanger; and
   a second temperature sensor positioned to sense a second bleed air temperature of the bleed air flow downstream of the first heat exchanger, wherein the first and second bleed air temperatures are used to determine the first bleed air temperature drop.

3. The system of claim 2, further comprising:
   a second heat exchanger configured to provide cooling for the bleed air flow, wherein the controller is further configured to determine the predicted ram flow based on a second bleed air temperature drop across the second heat exchanger.

4. The system of claim 3, further comprising:
   a third temperature sensor positioned to sense a third bleed air temperature of the bleed air flow upstream of the second heat exchanger; and
   a fourth temperature sensor positioned to sense a fourth bleed air temperature of the bleed air flow downstream of the second heat exchanger, wherein the third and fourth bleed air temperatures are used to determine the second bleed air temperature drop.

5. The system of claim 4, further comprising:
   a fifth temperature sensor positioned to sense the ram air temperature of the ram air flow at the ram air inlet.

6. The system of claim 1, wherein the ram air temperature is estimated by the controller.

7. The system of claim 1, further comprising:
   a flow sensor positioned upstream of the first heat exchanger and configured to sense the flow rate of the bleed air flow and provide the sensed flow rate to the controller.

8. The system of claim 1, wherein the controller receives a ram flow command indicative of a desired ram flow, and wherein the controller is further configured to control the ram inlet actuator based on a comparison of the ram flow command and the predicted ram flow.

9. The system of claim 1, wherein the system is an aircraft environmental control system.

10. A method of controlling a ram inlet actuator to control ram air provided for cooling a bleed air flow, the method comprising:
    determining, by a controller, a ram air temperature at a ram air inlet, wherein the ram inlet actuator is positioned at the ram air inlet to control ram air flow of the ram air to a first heat exchanger;
    determining, by the controller, a first temperature drop of the bleed air flow across the first heat exchanger, wherein the first heat exchanger is positioned to provide cooling for the bleed air flow;
    determining, by the controller, a predicted ram flow using the ram air temperature and the first temperature drop; and
    controlling the ram inlet actuator based on the predicted ram flow.

11. The method of claim 10, wherein measuring, by the controller, a first temperature drop of the bleed air flow across the first heat exchanger comprises:
    sensing, by a first temperature sensor, a first bleed air temperature of the bleed air flow upstream of the first heat exchanger;
    sensing, by a second temperature sensor, a second bleed air temperature of the bleed air flow downstream of the first heat exchanger; and
    determining the first temperature drop using the first and second bleed air temperatures.

12. The method of claim 11, further comprising:
    measuring, by the controller, a second temperature drop of the bleed air flow across a second heat exchanger, wherein the second heat exchanger is also positioned to provide cooling for the bleed air flow, wherein the predicted ram flow is determined by the controlled based further upon the second temperature drop.

13. The method of claim 12, wherein measuring, by the controller, the second temperature drop of the bleed air flow across the second heat exchanger comprises:
    sensing, by a third temperature sensor, a third bleed air temperature of the bleed air flow upstream of the second heat exchanger;
    sensing, by a fourth temperature sensor, a fourth bleed air temperature of the bleed air flow downstream of the second heat exchanger; and
    determining the second temperature drop using the third and fourth bleed air temperatures.

14. The method of claim 13, wherein determining, by the controller, the ram air temperature at the ram air inlet comprises:
    sensing, by a fifth temperature sensor, the ram air temperature of the ram air flow at the ram air inlet.

15. The method of claim 13, wherein determining, by the controller, the ram air temperature at the ram air inlet comprises:

predicting, by the controller, the ram air temperature of the ram air flow at the ram air inlet.

16. The method of claim 10, further comprising:
sensing, by a flow sensor positioned, a flow rate of the bleed air flow upstream of the first heat exchanger, wherein the controller is further configured to determine the predicted ram air flow based on the sensed flow rate.

17. The method of claim 10, further comprising:
receiving, by the controller, a ram flow command indicative of a desired ram flow,
comparing, by the controller, the ram flow command and the predicted ram flow to determine a flow difference.

18. The method of claim 17, wherein controlling the ram inlet actuator based on the predicted ram flow comprises controlling the ram inlet actuator based on the flow difference.

19. An aircraft environmental control system comprising:
a primary heat exchanger positioned to provide cooling for a bleed air flow using a received ram air flow, wherein the ram air flow is received from a ram air inlet;
a secondary heat exchanger positioned to provide cooling for the bleed air flow using the received ram air flow;
a ram inlet actuator positioned at the ram air inlet and configured to control the ram air flow; and
a controller configured to determine a first temperature drop of the bleed air flow across the primary heat exchanger, a second temperature drop of the bleed air flow across the secondary heat exchanger, a flow rate of the bleed air flow upstream of the primary heat exchanger, and a ram air temperature at the ram air inlet, and wherein the controller is configured to determine a predicted ram air flow based on the first and second temperature drops, the flow rate, and the ram air temperature, and wherein the controller is configured to control the ram inlet actuator based on the predicted ram air flow.

20. The aircraft environmental control system of claim 19, further comprising:
a first temperature sensor positioned to sense a first bleed air temperature of the bleed air flow upstream of the primary heat exchanger;
a second temperature sensor positioned to sense a second bleed air temperature of the bleed air flow downstream of the primary heat exchanger, wherein the first and second bleed air temperatures are used to determine the first temperature drop;
a third temperature sensor positioned to sense a third bleed air temperature of the bleed air flow upstream of the secondary heat exchanger;
a fourth temperature sensor positioned to sense a fourth bleed air temperature of the bleed air flow downstream of the secondary heat exchanger, wherein the third and fourth bleed air temperatures are used to determine the second temperature drop;
a fifth temperature sensor positioned to sense the ram air temperature of the ram air flow at the ram air inlet; and
a flow sensor positioned upstream of the primary heat exchanger and configured to sense the flow rate of the bleed air flow upstream of the primary heat exchanger.

* * * * *